UNITED STATES PATENT OFFICE.

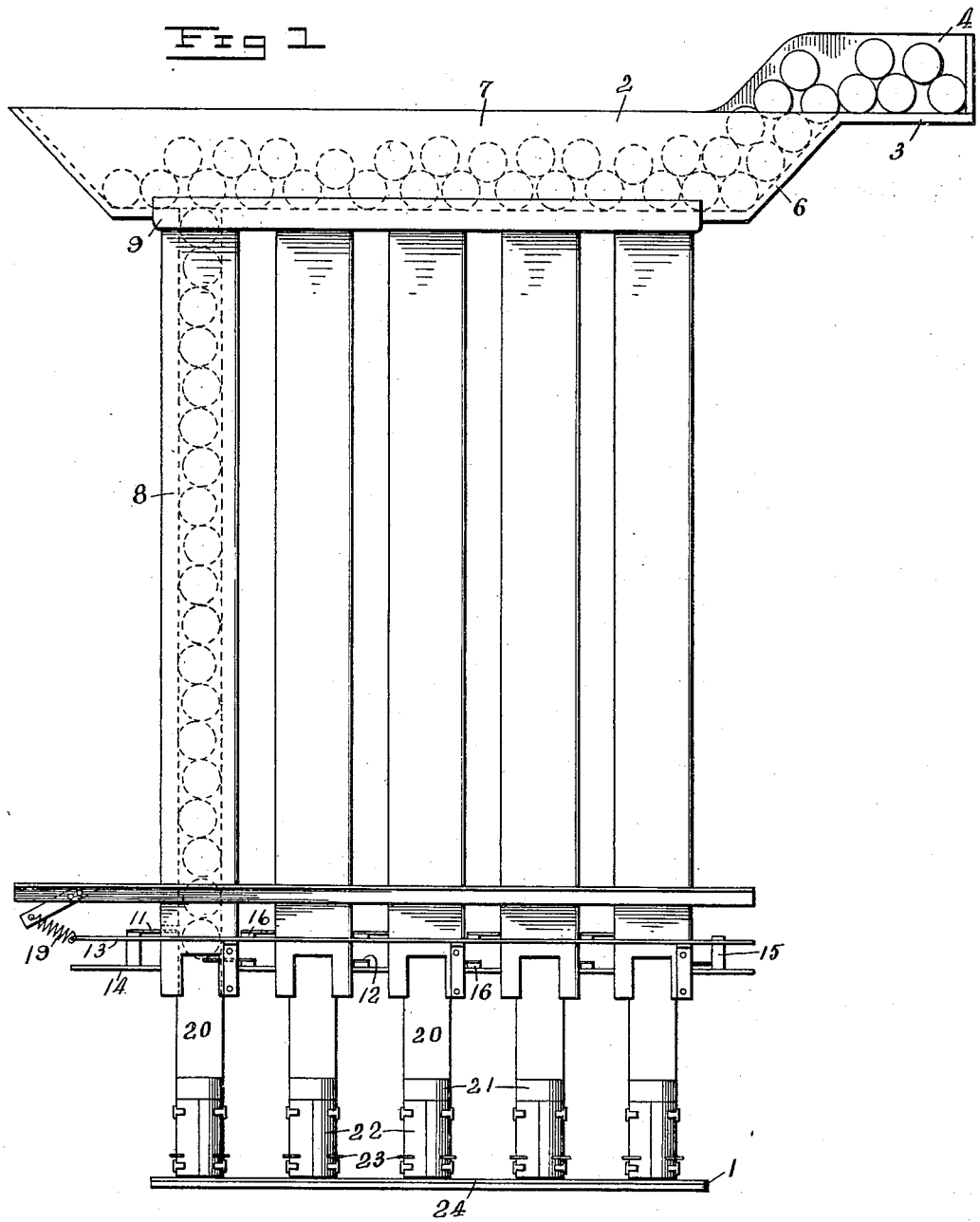

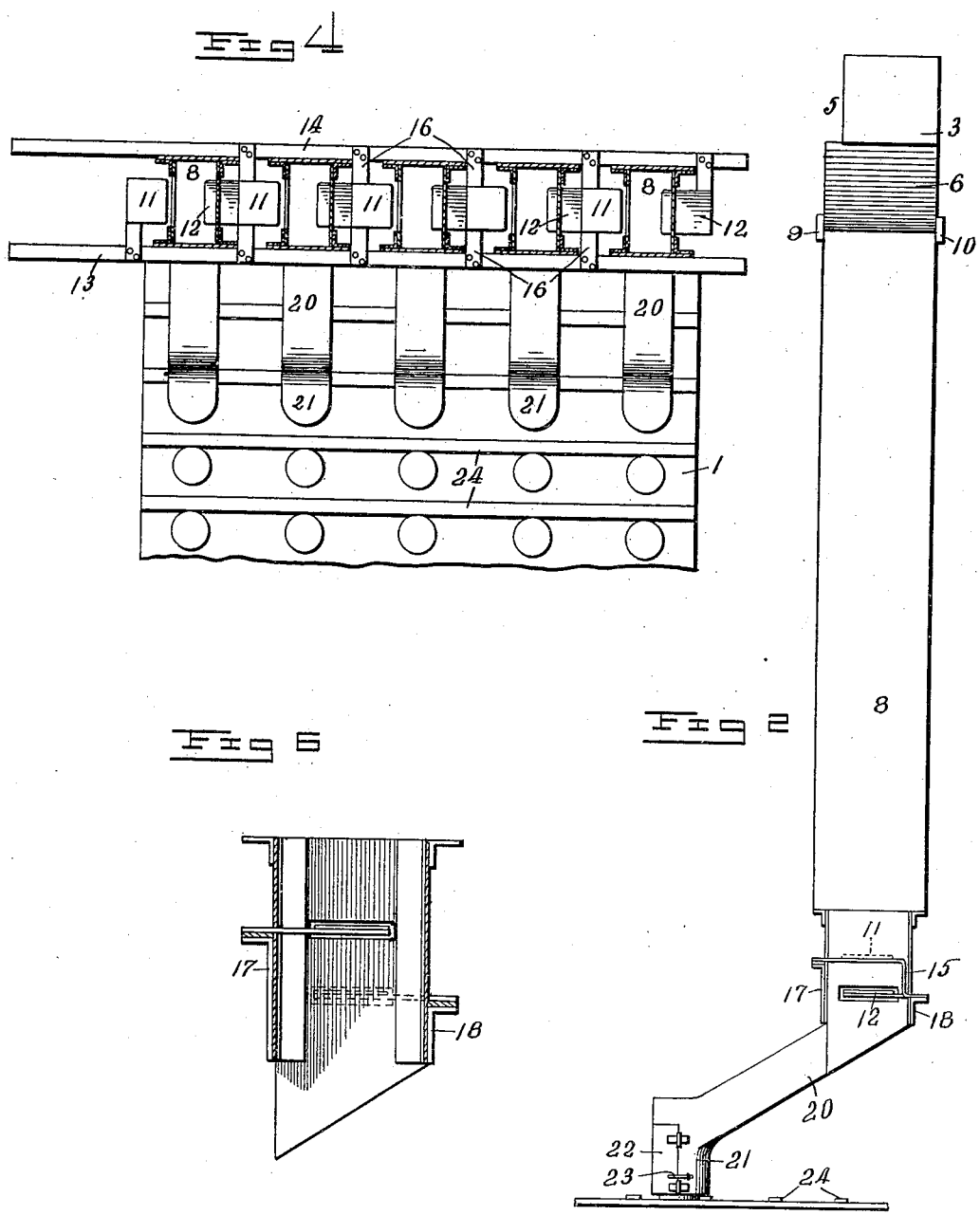

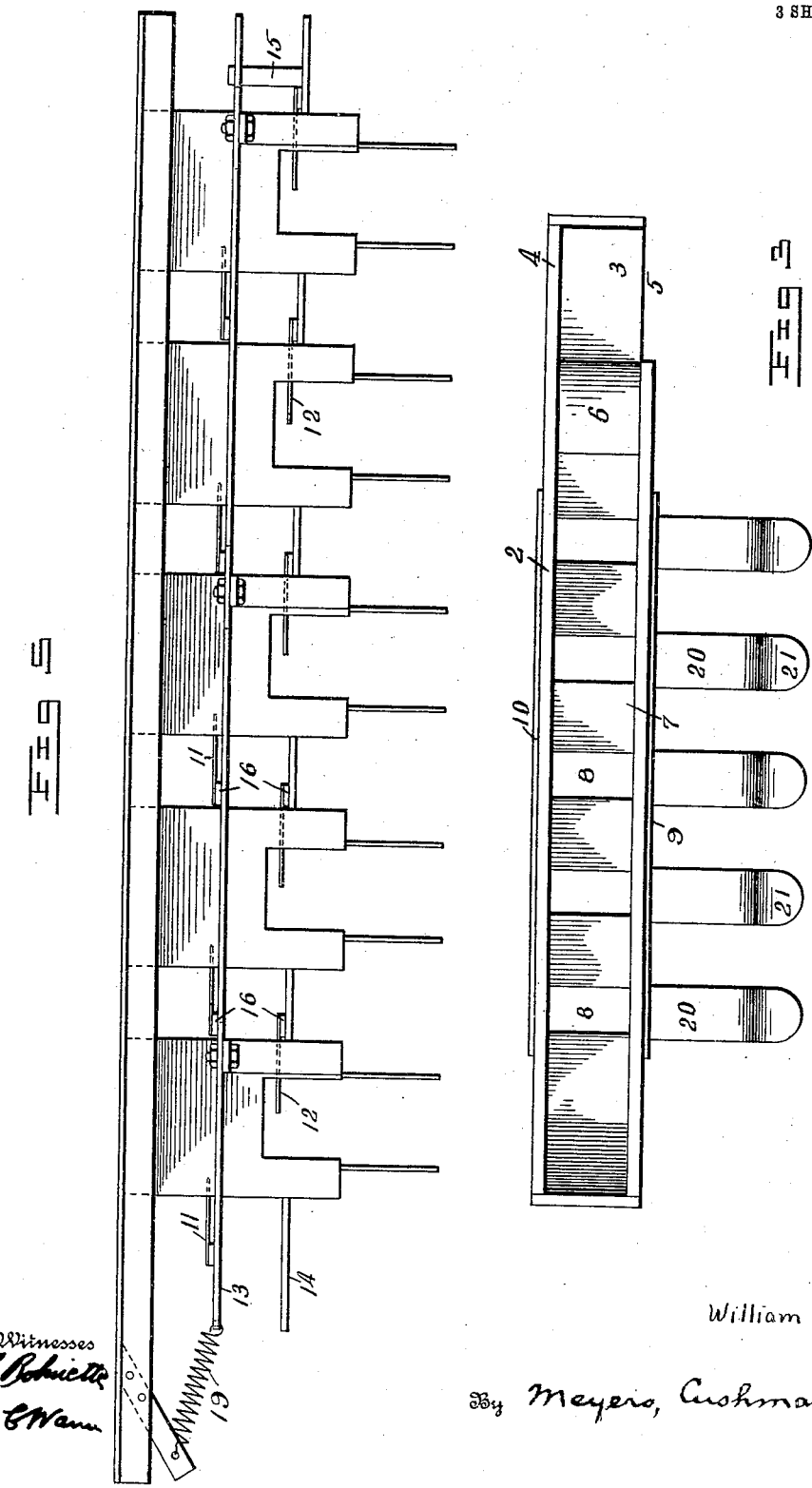

WILLIAM L. WIGHT, OF RICHMOND, VIRGINIA, ASSIGNOR TO SOUTHERN MANUFACTURING COMPANY, OF RICHMOND, VIRGINIA, A CORPORATION OF VIRGINIA.

CAN-FEEDING DEVICE.

945,658.      Specification of Letters Patent.      Patented Jan. 4, 1910.

Application filed June 26, 1909. Serial No. 504,610.

*To all whom it may concern:*

Be it known that I, WILLIAM L. WIGHT, a citizen of the United States, residing at Richmond, in the county of Henrico and State of Virginia, have invented new and useful Improvements in Can-Feeding Devices, of which the following is a specification.

This invention relates to improvements in machines for feeding cans to can filling or can filling and weighing machines, and has for its object to provide a novel mechanism by which the cans are fed onto the conveyer belt of such machines, the cans resting on their bottoms on the conveyer belt, open ends upward to receive the material to be filled thereinto.

The invention consists in the apparatus hereinafter described and illustrated, and then pointed out in the claims appended to the description.

In the accompanying drawings illustrating the invention, Figure 1 is an elevation of the can feeding mechanism showing a battery or plurality of feeding magazines adapted to feed a row of cans onto the conveyer belt of the can filling or can filling and weighing machine. Fig. 2 is an end or edge elevation. Fig. 3 is a top plan view. Fig. 4 is a section taken on a line of Fig. 1, just above the magazine valves. Fig. 5 is an enlarged detail of the valve or escapement mechanism for releasing the cans one at a time from the can magazines. Fig. 6 is a sectional detail.

In the accompanying drawings, the reference numeral 1 designates the conveyer-belt of a can filling or can filling and weighing machine, by which cans are conveyed to the filling or filling and weighing mechanism.

The invention is not concerned with the type of filling or filling and weighing machine, and such mechanism is not illustrated, but only a suitable can conveyer belt for such a machine, onto which the cans are to be fed by the apparatus of my invention.

Located above the conveyer belt 1, and preferably on a floor of the building above that on which the conveyer belt is located, is a trough 2, shown in plan view in Fig. 3 of the drawing and in elevation in Fig. 1. Preferably, this trough comprises a table 3 having a rear wall or abutment 4 and open front 5 to facilitate the deposit of the cans thereon manually, the wall 4 serving as a gage or abutment. It is designed that the cans shall be disposed on this table of the trough with the open ends of the cans pointing in the same direction. Adjacent the table 3 the trough is dished, as shown at 6 in Fig. 1, to provide a compartment 7 into which the cans may be easily moved from the table 3 by the operator.

In open communication with the trough is a gravity can-magazine 8. I have shown a battery of magazines arranged in alinement to feed a row of cans to the belt 1 transversely of the latter, and connected at their upper ends by flanges 9, 10, between which the trough 2 is arranged.

Within the scope of my invention there may be one, or a battery or plurality of magazines of any desired number.

In describing the invention I will refer to but one magazine, as the others are duplicates.

In operation the cans pass from the compartment 7 of the trough into the magazine, the operator agitating or manipulating the cans to constantly supply a column of cans thereto, as shown with respect to the left hand magazine-channel in Fig. 1, the cans passing into the magazine and resting in column form in circumferential contact, as shown. The cross-sectional diameter of the magazine is slightly greater than the diameter of the cans, so that the latter may by gravity pass therethrough freely.

At the lower end of the magazine is arranged a duplex valve or gate mechanism adapted to release the cans one at a time therefrom. When a magazine consisting of a battery or plurality of channels is employed, a valve mechanism commensurate with such battery or plurality of magazine channels is utilized, and I desire it to be understood that, within the scope of the invention, the valve mechanism will be appropriate to the number of magazine channels employed in the equipment of the apparatus, whether one, two or more. This duplex valve or gate mechanism comprises valves 11 which separate or select the bottom can or cans in the magazine so that they may be released and discharged therefrom, and a valve 12 to release such selected bottom can or cans and permit the same to discharge by gravity.

The specific example of valve or gate mechanism shown, comprises slides 13, 14 arranged in different planes, as clearly shown in Figs. 1, 2 and 5, said slides being connected together to move in unison by means of a strap 15, and connected to said slides by arms 16 are the valves 11 and 12, so alternately arranged that when the valve 12 is moved to open position to discharge the lowermost can, the valve 11 interposes to arrest or sustain the superposed file of cans, allowing the lowermost can only to discharge. On the reverse stroke of the valve mechanism the valve 11 opens allowing the column of cans to descend until the lowermost can is arrested by the valve 12, and when said valve is moved to discharge this lowermost can, the same sequence of operation takes place.

The slides 13 and 14 are preferably arranged to move on tracks 17 and 18, such tracks being clearly shown in Figs. 2 and 6 of the drawing.

It is designed that the valve mechanism shall operate periodically in timed relation to the movement of the conveyer of the can filling or can filling and weighing machine, and to this end such valve mechanism is designed to be actuated by some moving part of the can filling or can filling and weighing machine. For example, the valve mechanism may be reciprocated in one direction by means of a cam of the filling or weighing machine, and in opposite direction by means of a spring 19.

Leading from the lower end of each magazine to a vertically depending box 21, the lower open end of which is above the conveyer belt 1 and preferably traversed thereby, is an inclined chute into which the cans pass when released, one by one, from the magazine by the valve mechanism described, and along which they slide closed or bottom end foremost, which position is assumed by reason of the disposition of the cans in the magazine, their closed ends pointing in the same, forward, direction. These closed ends are also of greater weight than the open ends of the cans. At the end of the inclined chute the cans pass into the vertically depending box 21 with their bottoms down and come to rest on the conveyer 1, open ends up ready to be filled.

To prevent the cans from toppling over when they meet the conveyer belt and permit their being advanced by the conveyer belt to the can filling or can filling and weighing mechanism, open-ends up, the box is provided with swinging doors 22 maintained closed by means of a very weak spring 23.

The conveyer belt is provided at suitable intervals with can engaging means, such as cleats 24, which engage the cans and, as the conveyer belt travels cause the cans to open the doors and pass from the box 21 and be conveyed to the place of filling or filling and weighing.

In the foregoing description I have specifically referred to cans for convenience, but I desire it to be understood as including within that term other vessels which it may be desired conveyed, open end up, to filling or filling and weighing mechanism or the like.

Having thus described the invention, what I claim is,—

1. The combination with a conveyer of a can feeding machine or the like, of apparatus for feeding cans thereto comprising a magazine designed to receive the cans in circumferential contact, an inclined chute leading from the lower end of said magazine and along which the cans slide bottom ends foremost, a vertical open bottom chamber at the lower end of and communicating with said chute and located above the conveyer belt, and valve mechanism for releasing cans one by one to pass from the magazine to the inclined chute.

2. The combination with a conveyer of a can filling machine or the like, of apparatus for feeding cans thereto comprising a magazine arranged above the same, an inclined can chute leading from said magazine to said conveyer, a vertical chamber communicating with said inclined chute and having an open bottom traversed by said conveyer and valve mechanism for releasing the cans one by one to pass from the can magazine to said chute.

3. The combination with a conveyer of a can filling machine or the like, of apparatus for feeding cans thereto comprising a magazine arranged above the same, an inclined can chute leading from said magazine to said conveyer, a vertical chamber communicating with said inclined chute and having an open bottom traversed by said conveyer, said vertical chamber being provided with doors permitting the egress of the cans from said chamber.

4. The combination with a conveyer of a can filling machine or the like, of apparatus for feeding cans thereto comprising a magazine arranged above the same, an inclined chute leading from said magazine to said conveyer, a vertical chamber communicating with said inclined chute and having an open bottom traversed by said conveyer, and a duplex valve mechanism for releasing cans one at a time from the can magazine into said chute.

5. The combination with a conveyer of a can filling machine or the like, of apparatus for feeding cans thereto comprising a magazine arranged above the same, an inclined can chute leading from said magazine to said conveyer, a vertical chamber communicating with said inclined chute and having an open bottom traversed by said conveyer, said vertical chamber being provided with spring doors permitting the egress of the cans from said chamber.

6. The combination with a conveyer of a can filling machine or the like, of apparatus for feeding cans thereto comprising a magazine arranged above the same, an inclined can chute leading from said magazine to said conveyer, a vertical chamber communicating with said inclined chute and having an open bottom traversed by said conveyer, and duplex valve mechanism for releasing the cans one by one to pass from the can magazine into the said chute.

7. The combination with a conveyer of a can filling machine or the like, a can trough located above said conveyer, a gravity can magazine communicating with said trough, an inclined can chute leading from said magazine and terminating in a chamber traversed by the conveyer belt into which chamber cans are deposited bottom down by said chute, doors for said chamber, and means on the conveyer belt to engage the cans and cause the latter in the movement of the conveyer belt to open said doors and pass from said chamber.

8. The combination with a conveyer belt of a can filling machine or the like, the combination with a trough, a plurality of gravity can magazines communicating with said trough, a plurality of inclined chutes leading from the lower ends of said magazines and terminating in chambers traversed by said conveyer belt, means for releasing cans one at a time from said magazines to said chutes, doors for said chambers, and means carried by the conveyer belt for causing the cans to open said doors to pass from said chambers.

9. The combination with a gravity can magazine, of an inclined chute leading from the lower end thereof, a depending, vertical, open bottom chamber at the lower end of said chute, and valve mechanism for releasing cans one by one to pass from the can magazine to said chute.

10. The combination with a gravity can magazine, of an inclined chute leading from the lower end thereof, a depending, vertical, open bottom chamber at the lower end of said chute provided with a door to permit the passage of cans therefrom, and valve mechanism for releasing the cans one by one to pass from the can magazine to said chute.

In testimony whereof I have hereunto set my hand in presence of two subscribing witnesses.

WILLIAM L. WIGHT.

Witnesses:
CARL J. ROELKER,
P. C. RUDD.